(12) United States Patent
Ger et al.

(10) Patent No.: US 8,247,922 B2
(45) Date of Patent: Aug. 21, 2012

(54) POWER SUPPLY DEVICE WITH LOW STANDBY POWER CONSUMPTION

(75) Inventors: Chih-Chan Ger, Jhongli (TW); Chia-Kun Chen, Jhongli (TW)

(73) Assignee: Ampower Technology Co., Ltd., Jhongli, Taoyuan County (TW)

( * ) Notice: Subject to any disclaimer, the term of this patent is extended or adjusted under 35 U.S.C. 154(b) by 418 days.

(21) Appl. No.: 12/538,258

(22) Filed: Aug. 10, 2009

(65) Prior Publication Data

US 2010/0110730 A1    May 6, 2010

(30) Foreign Application Priority Data

Oct. 31, 2008   (TW) .............................. 97142083 A

(51) Int. Cl.
*H02J 3/00* (2006.01)
*H02M 3/335* (2006.01)

(52) U.S. Cl. ........................................ 307/17; 363/21.1

(58) Field of Classification Search ................... 307/17; 363/15, 21.01, 21.04, 21.1, 89
See application file for complete search history.

(56) References Cited

U.S. PATENT DOCUMENTS 6,967,851 B2 * 11/2005 Yang et al. ..................... 363/16
* cited by examiner

*Primary Examiner* — Michael Rutland Wallis
(74) *Attorney, Agent, or Firm* — Altis Law Group, Inc.

(57) ABSTRACT

A power device transforms input power into power for output, and includes an input unit, a power factor unit, an output unit, a power saving unit, and a control signal port. The power saving unit includes a first electronic switch, a first diode and a single-direction switch. The first electronic switch is connected between the input unit and the power factor unit. An anode of the first diode is connected to the input unit, and a cathode of the first diode is connected to the output unit. The single-direction switch is connected to the power factor unit and the output unit to block current from the output unit to the power factor unit. The control signal port controls an on/off state of the first electronic switch.

14 Claims, 6 Drawing Sheets

POWER SUPPLY DEVICE WITH LOW STANDBY POWER CONSUMPTION

BACKGROUND

1. Technical Field

The disclosure relates to power devices, and particularly to a power device with low standby power consumption.

2. Description of Related Art

FIG. 1 is a schematic diagram of a commonly used power device 100. The power device 100 includes an input unit 10, a power factor unit 11, an output unit 12, and a control signal port 13. The output unit 12 includes an output transformer T1 having two secondary windings N2 and two electronic switches 24. The electronic switches 24 are respectively connected between the two secondary windings N2 and two output ports 14 to provide power to loads. The control signal port 13 controls an on/off state of the electronic switches 24.

If the loads enter a sleep state, the power device 100 opens the electronic switches 124 under control of the control signal port 13 to deny power to the loads. However, the input unit 10 and the power factor unit 11 are still connected to input power, causing power loss.

DETAILED DESCRIPTION

Figure 1:
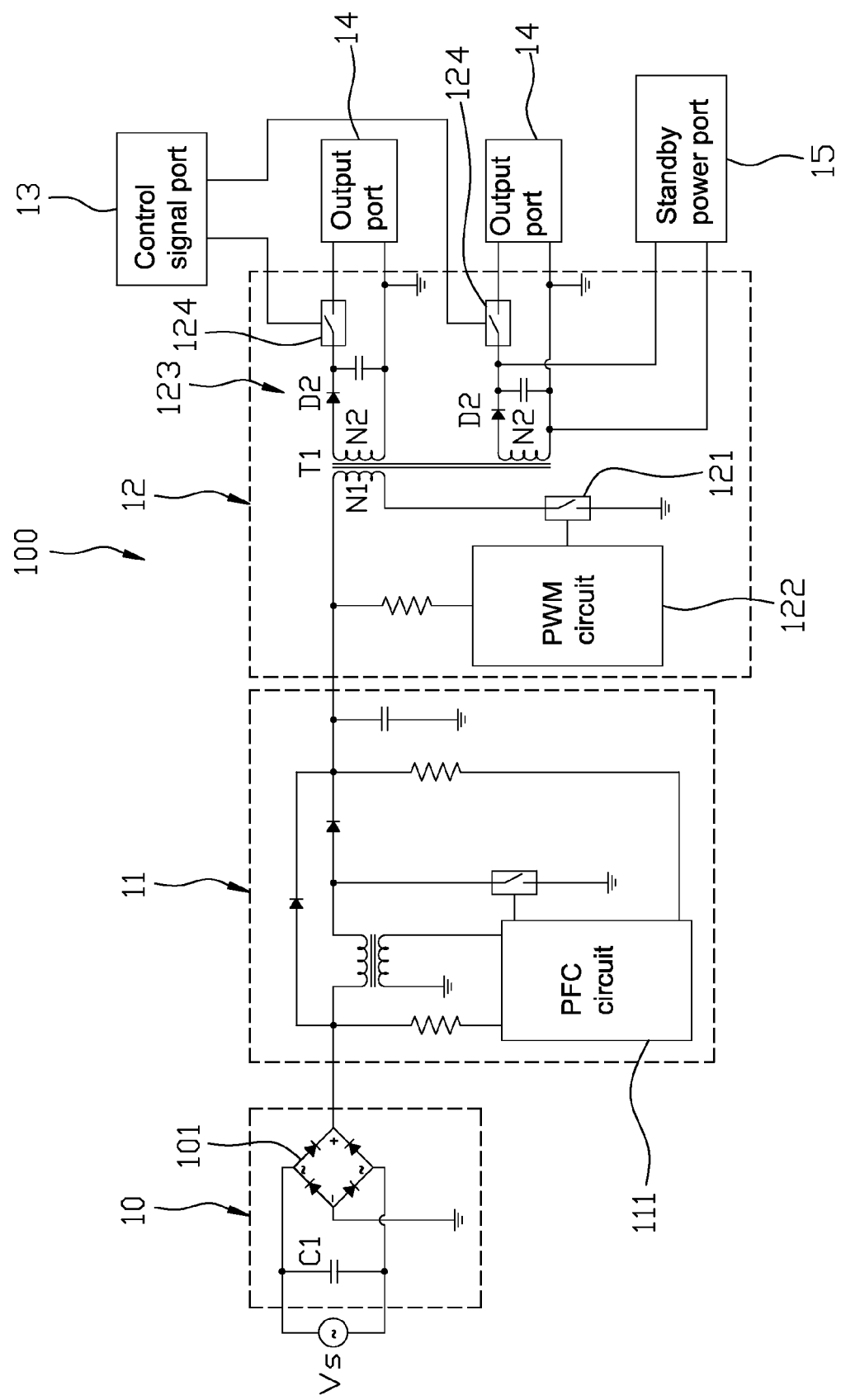
FIG. 1 is a schematic diagram of a commonly used power device.
Figure 2:
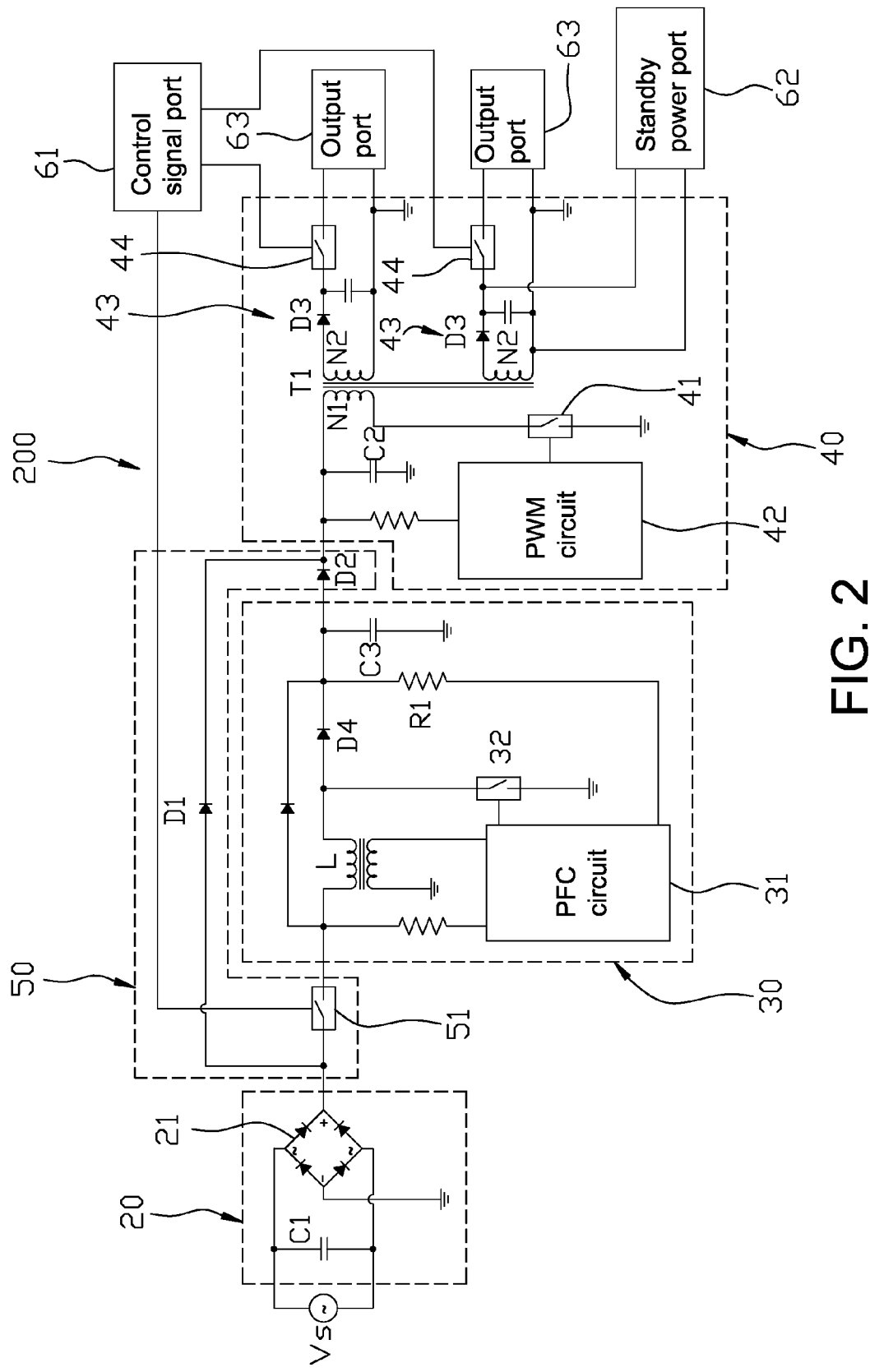
FIG. 2 is a schematic diagram of a first embodiment of a power device as disclosed.

Before the embodiments are described, it is noted that similar elements in different embodiments are referred to same reference numbers. FIG. 2 is a schematic diagram of a first embodiment of a power device 200 as disclosed. The power device 200 transforms input power Vs into power for output to loads connected thereto, and includes an input unit 20, a power factor unit 30, an output unit 40, a power saving unit 50, a control signal port 60, and a standby power port 62. In this embodiment, the power device 200 may transform alternating current (AC) power into direct current (DC) power for output to the loads.

The input unit 20 includes a filter C1, and a first rectifying circuit 21 connected to the filter C1 to rectify the input power Vs. The input power Vs is first filtered by the filter C1, and then rectified by the first rectifying circuit 21. In one embodiment, the filter C1 may be a capacitor. The power factor unit 30 includes a power factor correction (PFC) circuit 31 to receive and correct the rectified power from the first rectifying circuit 21.

The power saving unit 50 includes a first electronic switch 51, a first diode D1 and a single-direction switch D2. The first electronic switch 51 is connected between the first rectifying circuit 21 and the power factor correction circuit 31. The rectified power from the first rectifying circuit 21 is also transmitted to the output unit 40 through the first diode D1 before being transmitted to the first electronic switch 51. That is, the first diode D1 is connected between the first rectifying circuit 21 and the output unit 40. The single-direction switch D2 is connected to the power factor unit 30 and the output unit 40 to block current from the output unit 40 to the power factor unit 30. Thus, unnecessary power loss, especially power loss in a standby state of the power device 200, is avoided. In one embodiment, the single-direction switch D2 may be a diode, and is connected between the power factor unit 30 and the output unit 40. It is understood that the single-direction switch D2 may use other switch elements, such as transistors.

The output unit 40 includes an output transformer T1 having a primary winding N1 and at least one secondary winding N2, a power switch 41, a pulse width modulation (PWM) circuit 42, at least one second rectifying circuit 43, and at least one second electronic switch 44. The numbers of the second rectifying circuit 43, the second electronic switch 44, and the secondary winding N2 are the same. In one embodiment, the numbers of the second rectifying circuits 43, the second electronic switches 44, and the secondary windings N2 are two.

The primary winding N1 of the output transformer T1 couples to the power factor unit to receive the corrected power, and the secondary winding N2 is connected to the second rectifying circuit 43. The power switch 41 is connected to the primary winding N1, and is under control of the PWM circuit 42. The second rectifying circuit 43 performs half-wave rectification on output power from the secondary winding N2. In one embodiment, the second rectifying circuit 40 may use a second diode D3.

The second electronic switch 44 is connected between the second rectifying circuit 43 and output ports 63, and provides power to the loads connected to the output ports 63. The second electronic switch 44 and the first electronic switch 51 may be transistors, metal-oxide semiconductors (MOS), or relays. In one embodiment, the numbers of the output ports 63 and the second electronic switches 44 are also the same. The output unit 40 further includes a first filtering capacitor C2 connected to the primary winding N1. In one embodiment, the first filtering capacitor C2 filters the output power from the power factor circuit 30 into direct current (DC) power.

The control signal port 61 receives control signals from a control device outside of the power device 200, and controls an on/off state of the first electronic switch 51.

The standby power port 62 receives output power from one of the second rectifying circuits 43, and provides necessary power to the loads to maintain a sleep state and awaken the power device 200 and the loads quickly. In one embodiment, the standby power port 62 is connected between the secondary winding N2 and the second electronic switch 44.

In one embodiment, the power factor unit 30 further includes a coil L, a second electronic switch 32, a third diode D4, a resistor R1 and a capacitor C3. The coil L receives the rectified power from the first rectifying circuit 21, and outputs power to the output unit 40 via rectifying by the third diode D4 and filtering by the capacitor C3. In one embodiment, the output power from the capacitor C3 may be DC power with a high voltage value, such as, 380V. The third electronic switch 32 is connected between an output end of the coil L and ground, and is controlled by the power factor correction circuit 31. In one embodiment, the third electronic switch 32 may be grounded through a resistor. The resistor R1 feeds back power rectified by the third diode D4 to the power factor correction circuit 31. In one embodiment, the coil L may be a primary winding of a transformer that has a secondary winding providing power to the power factor correction circuit 31. In one embodiment, the output unit 40 transforms the output power from the capacitor C3 into DC power with a low voltage value, such as, 5V.

When in the standby state, the power device 200 not only denies power to the loads, but also opens the first electronic switch 51 by the control signals from the control signal port 61 to deny power to the power factor unit 30, and only provides minimal power to the output unit 40 through the first diode D1. Thus, power loss of the power device 200 in the standby state is further reduced to achieve strict standby power loss standards and comply with power saving criteria.

Figure 3:
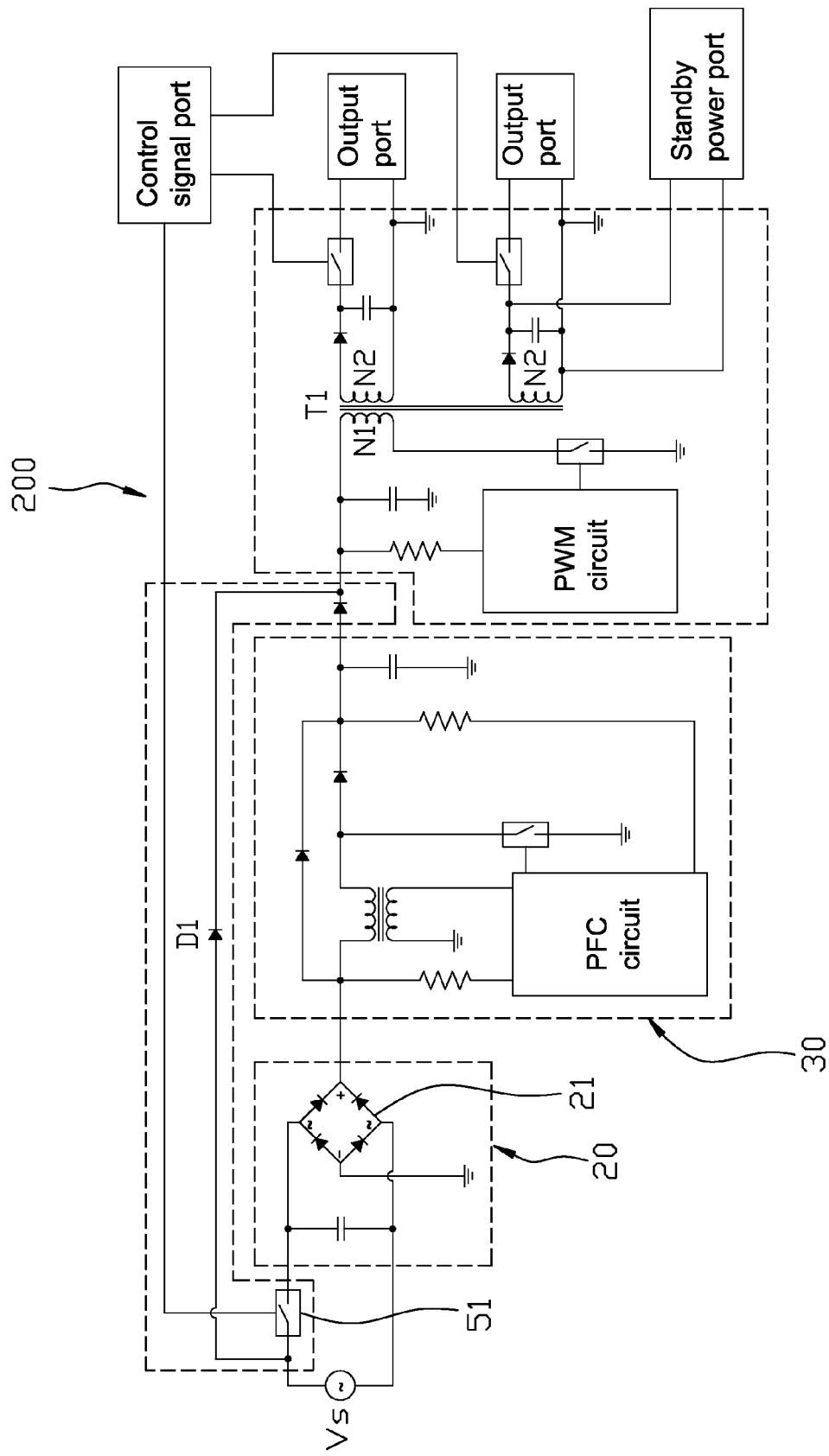
FIG. 3 is a schematic diagram of a second embodiment of a power device as disclosed.

FIG. 3 is a schematic diagram of a second embodiment of the power device 200 as disclosed, differing from that of the first embodiment in connections of the first electronic switch 51 and the first diode D1 of the second embodiment. The first electronic switch 51 is connected to an input end of the first rectifying circuit 21, and receives the input power Vs. The first diode D1 receives the input power Vs and provides power to the output unit 40. Thus, when the power device 200 is in the standby state, and the first electronic switch 51 is kept open, power loss of the power factor unit 30 as well as of the input unit 20 is avoided, which results in lower standby power than that of the first embodiment.

Figure 4:
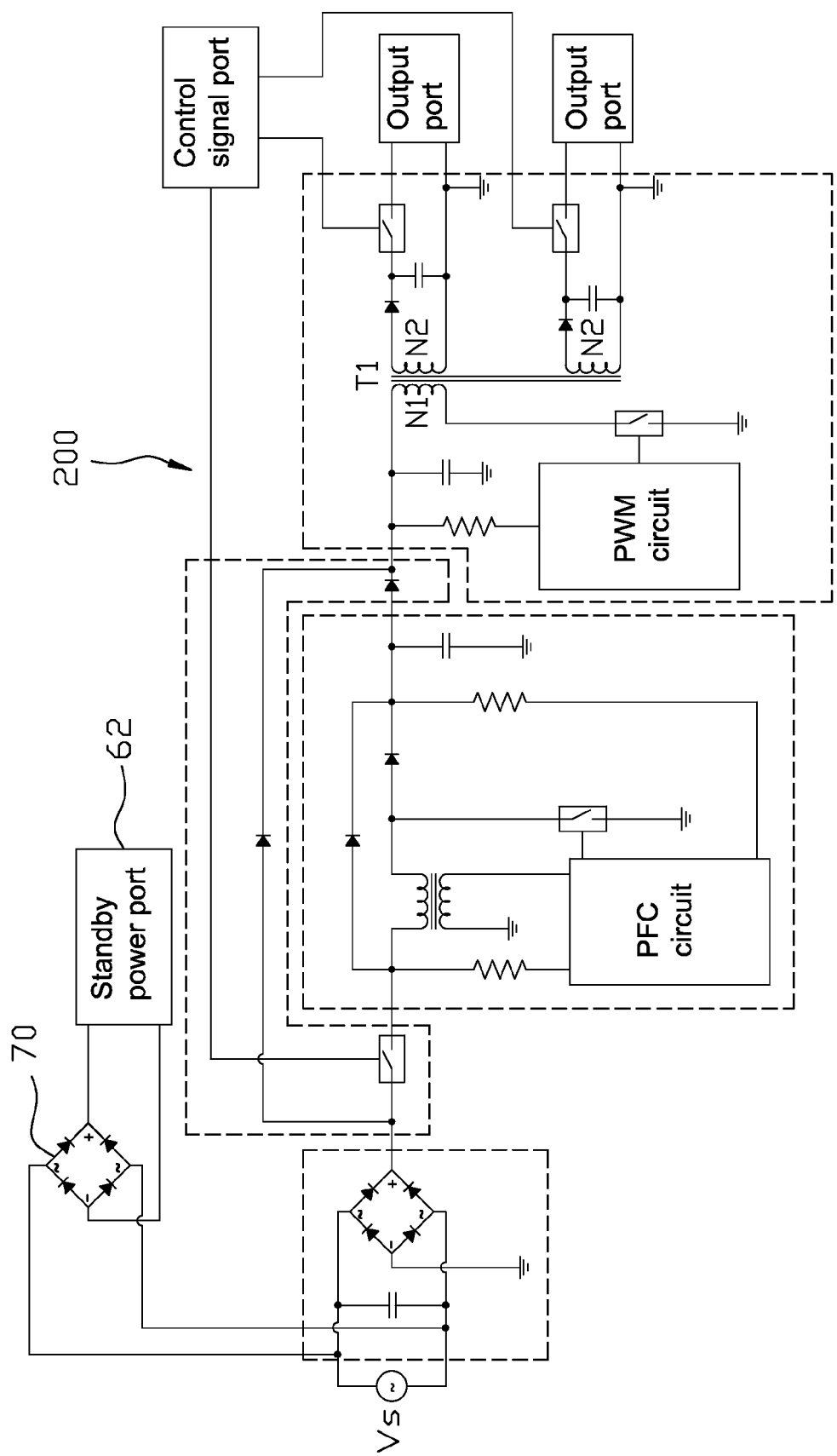
FIG. 4 is a schematic diagram of a third embodiment of a power device as disclosed.

FIG. 4 is a schematic diagram of a third embodiment of the power device 200 as disclosed, differing from that of the first embodiment in that the power device 200 of the third embodiment further includes a third rectifying circuit 70 receiving the input power Vs and connected to the standby power port 62.

Figure 5:
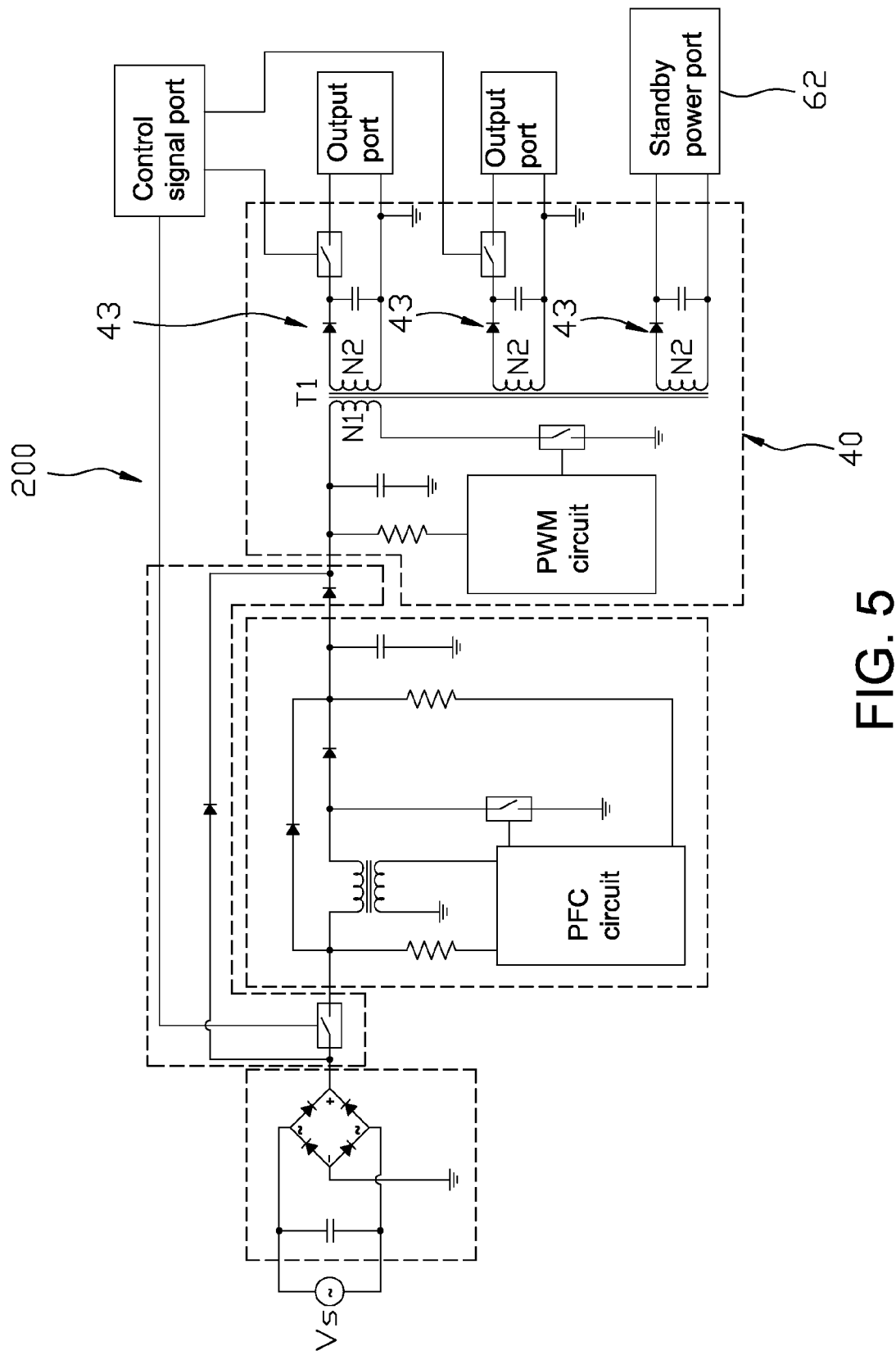
FIG. 5 is a schematic diagram of a fourth embodiment of a power device as disclosed.

FIG. 5 is a schematic diagram of a fourth embodiment of the power device 200 as disclosed, differing from that of the first embodiment in that the output transformer T1 of the output unit 40 has three secondary windings N2 and that the second rectifying circuit 43 rectifies output power from the three secondary windings N2, one of which is provided to the standby power port 62.

Figure 6:
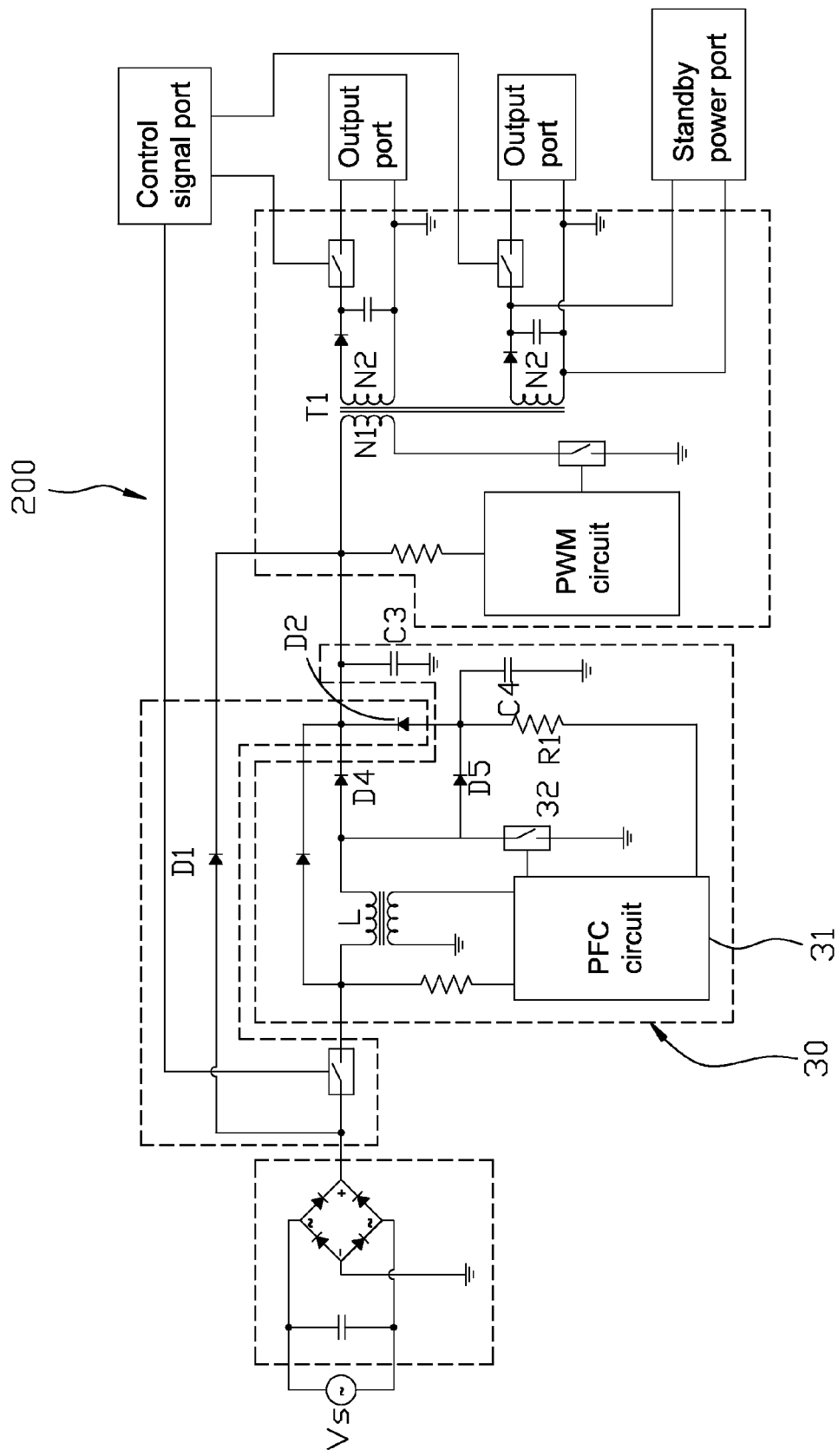
FIG. 6 is a schematic diagram of a fifth embodiment of a power device as disclosed.

FIG. 6 is a schematic diagram of a fifth embodiment of the power device 200 as disclosed, differing from that of the first embodiment in a structure of the power factor unit 30 and a connection between the power factor unit 30 and the single-direction switch D2. In this embodiment, the power factor unit 30 includes the power factor correction circuit 31, the coil L, the third electronic switch 32, the third diode D4, a fourth diode D5, the resistor R1, the capacitor C3 and a second filtering capacitor C4. Functions and connections of the coil L, the third diode D4, the capacitor C3, and the third electronic switch 32 of the fifth embodiment are similar to those of the first embodiment, therefore descriptions are omitted here.

An anode of the fourth diode D5 is connected to the output end of the coil L, and a cathode of the fourth diode D5 is connected to the power factor correction circuit 31 through the resistor R1. The fourth diode D5 provides power substantially the same as power rectified by the third diode D4 to the resistor R1 to feed back to the power factor correction circuit 31. One end of the second filtering capacitor C4 is connected between the fourth diode D5 and the resistor R1, and the other end of the second filtering capacitor C4 is grounded. The single-direction switch D2 is connected between the third diode D4 and the fourth diode D5, in this disclosure, especially between the cathodes of the third diode D4 and the fourth diode D5, and an anode of the single-direction switch D2 is connected to the cathode of the fourth diode D5.

In the fifth embodiment, the second filtering capacitor C4 has a low capacitance value, and the first filtering capacitor C2 with a large capacitance value of the first embodiment may be omitted. Thus, cost of the power device 200 of the fifth embodiment is reduced.

It is noted that the designs of the standby power port 62 of the third embodiment and the fourth embodiment can also be used in the power device 200 of the second embodiment, and that the designs of the power factor unit 30 and the power saving unit 50 of the fifth embodiment can also be used in the power device 200 of the second embodiment.

The foregoing disclosure of various embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto and their equivalents.

What is claimed is:

1. A power device, comprising:
an input unit comprising a first rectifying circuit to rectify input power;
a power factor unit comprising a power factor correction circuit to receive and correct the rectified power from the first rectifying circuit;
an output unit comprising an output transformer comprising a primary winding and at least one secondary winding, a power switch, a pulse width modulation (PWM) circuit and at least one second rectifying circuit, wherein the primary winding couples to the power factor unit to receive the corrected power, and the at least one secondary winding is connected to the at least one second rectifying circuit, wherein the power switch is connected to the primary winding and is under control of the PWM circuit;
a power saving unit comprising a first electronic switch, a first diode and a single-direction switch, wherein the first electronic switch is connected between the first rectifying circuit and the power factor unit, an anode of the first diode is connected to the first rectifying circuit and a cathode of the first diode is connected to the output unit, and the single-direction switch is connected to the power factor unit and the output unit to block current from the output unit to the power factor unit; and
a control signal port to control an on/off state of the first electronic switch;
wherein the power factor unit further comprises a coil, a second diode, a third diode, and a filtering capacitor, wherein the coil receives the rectified power from the first rectifying circuit, and outputs power to the output unit through the second diode, wherein an anode of the third diode is connected to an output end of the coil and a cathode of the third diode is connected to the power factor correction circuit through a resistor, wherein one end of the filtering capacitor is connected to the cathode of the third diode, and the other end of the filtering capacitor is grounded, and wherein the single-direction switch is connected between a cathode of the second diode and the cathode of the third diode.

2. The power device of claim 1, wherein the input unit further comprises a filter connected between the input power and the first rectifying circuit.

3. The power device of claim 1, further comprising a standby power port to receive output power from one of the at least one second rectifying circuit of the output unit.

4. The power device of claim 1, further comprising a standby power port and a third rectifying circuit connected to the standby power port and receiving the input power.

5. The power device of claim 1, further comprising a standby power port, wherein the output transformer comprises a plurality of secondary windings, and the output unit comprises a plurality of second rectifying circuits corresponding to the plurality of secondary windings to rectify output power from the plurality of secondary windings, and the standby power port receives output power from one of the plurality of second rectifying circuits.

6. The power device of claim 1, wherein the output unit further comprises at least one second electronic switch connected between the at least one second rectifying circuit and at least one output port.

7. The power device of claim 1, wherein the single-direction switch is connected between the power factor unit and the output unit.

8. A power device, comprising:
   an input unit comprising a first rectifying circuit to rectify input power;
   a power factor unit comprising a power factor correction circuit to receive and correct the rectified power from the first rectifying circuit;
   an output unit comprising an output transformer having a primary winding and at least one secondary winding, a power switch, a pulse width modulation (PWM) circuit and at least one second rectifying circuit, wherein the primary winding couples to the power factor unit to receive the corrected power, and the at least one secondary winding is connected to the at least one second rectifying circuit, wherein the power switch is connected to the primary winding and is under control of the PWM circuit;
   a power saving unit comprising a first electronic switch, a first diode and a single-direction switch, wherein the first electronic switch is connected to an input end of the first rectifying circuit and receives the input power, the first diode receives the input power and provides power to the output unit, and the single-direction switch is connected to the power factor unit and the output unit to block current from the output unit to the power factor unit; and
   a control signal port to control an on/off state of the first electronic switch;
   wherein the power factor unit further comprises a coil, a second diode, a third diode, and a filtering capacitor, wherein the coil receives the rectified power from the first rectifying circuit, and outputs power to the output unit through the second diode, wherein an anode of the third diode is connected to an output end of the coil, a cathode of the third diode is connected to the power factor correction circuit through a resistor, wherein one end of the filtering capacitor is connected to the cathode of the third diode, and the other end of the filtering capacitor is grounded, and wherein the single-direction switch is connected between a cathode of the second diode and the cathode of the third diode.

9. The power device of claim 8, wherein the input unit further comprises a filter connected between the first electronic switch and the first rectifying circuit.

10. The power device of claim 8, further comprising a standby power port to receive output power from one of the at least one second rectifying circuits of the output unit.

11. The power device of claim 8, further comprising a standby power port and a third rectifying circuit connected to the standby power port and receiving the input power.

12. The power device of claim 8, further comprising a standby power port, wherein the output transformer comprises a plurality of secondary windings, and the output unit comprises a plurality of second rectifying circuits corresponding to the plurality of secondary windings to rectify output power from the plurality of secondary windings, and the standby power port receives output power from one of the plurality of second rectifying circuits.

13. The power device of claim 8, wherein the output unit further comprises at least one second electronic switch connected between the at least one second rectifying circuit and at least one output port.

14. The power device of claim 8, wherein the single-direction switch is connected between the power factor unit and the output unit.

* * * * *